United States Patent Office 3,562,298
Patented Feb. 9, 1971

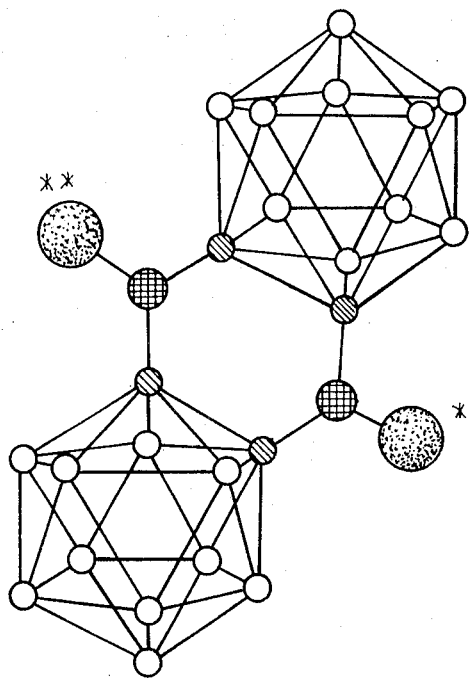

3,562,298
DIMERIC AZIDOPHOSPHA (III)-CARBORANES
Roy P. Alexander, Killingworth, and Hansjuergen A. Schroeder, Hamden, Conn., assignors to Olin Corporation, a corporation of Virginia
Continuation-in-part of applications Ser. No. 323,278 and Ser. No. 323,416, both Nov. 13, 1963. This application Oct. 9, 1967, Ser. No. 678,769
Int. Cl. C07c *117/00;* C07d *107/02*
U.S. Cl. 260—349                                   2 Claims

ABSTRACT OF THE DISCLOSURE

Dimeric azidophospha (III)-carboranes are prepared by reacting a dimeric halophospha (III)-carborane, such as:

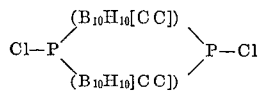

with an alkali metal azide such as sodium azide in the presence of an inorganic liquid and at a temperature ranging from about −20° C. to about +80° C. The dimeric azidophospha (III)-carboranes can be condensed with a diphosphine to yield valuable polymeric materials which, when compounded with inert mineral fillers and pressure molded, are suitable for use in high pressure and high temperature applications.

---

This is a continuation-in-part application of application Ser. No. 323,416, filed Nov. 13, 1963, now abandoned and of application 323,278, filed Nov. 13, 1963, now U.S. Patent 3,373,193.

This invention relates to dimeric azidophospha (III)-carboranes and to a method for their preparation. The novel dimeric azidophospha (III)-carboranes are useful in the preparation of high temperature resistant polymers.

In the process of this invention dimeric azidophospha (III)-carboranes are prepared by reaction a dimeric halophospha (III)-carborane of the formula:

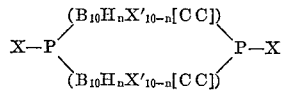

wherein X and X' are each selected from the group consisting of chlorine, bromine and iodine and $n$ is an integer of from 0 to 10 inclusive, with an azide of the formula:

wherein M is an alkali metal selected from the group consisting of sodium, potassium and lithium, in the presence of an inert organic liquid.

The reaction proceeds as shown in the following equation:

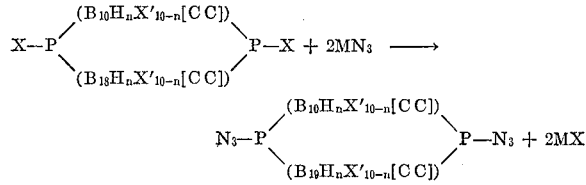

where X, X', M and $n$ have the same meaning as previously defined.

As previously stated the reaction is carried out while the reactants are dispersed in an inert organic liquid. Suitable inert organic liquids include, for example, monohydric alcohols of the formula:

wherein R' is an alkyl group having 1 to 8 carbon atoms and nitriles of the formula:

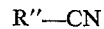

wherein R" is an alkyl group having 1 to 5 carbon atoms. Preferably primary alcohols are utilized although secondary alcohols, etc. can be employed. The temperature of the reaction can be varied widely from about −20° C. to about +80° C. and preferably will be from about −5° C. to about +40° C. Generally the reaction time will vary from about 0.5 to about 6 hours or more and preferably will be from about 0.5 to about 3 hours, depending upon the particular reactants, and other reaction conditions utilized. Although the reaction proceeds satisfactorily when stoichiometric quantities of the reactants are used, if desired, an excess of the azide of from about 1.25 to about 4 times the stoichiometric requirement can be employed.

In the process of this invention the product as it is formed precipitates from the reaction mixture and is recovered by filtration, centrifugation, decantation or any other convenient method. The solid product thus obtained is then washed with a large excess of water to remove any alkali metal chloride and unreacted starting materials which may be present and finally dried in vacuo to yield the pure dimeric azidophospha (III)-carborane.

Dimeric halophospha (III)-carboranes useful as starting materials in this process can be made by the method set forth in Alexander and Schroeder application Ser. No. 323,278, filed Nov. 13, 1963, now U.S. Patent No. 3,373,-193. For example, the compound of the formula:

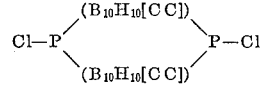

can be prepared by reacting phosphorus trichloride with dilithiocarborane in the presence of diethyl ether at a temperature of about 0° C. Suitable dimeric halophospha (III)-carboranes include, for example, compounds of the formula:

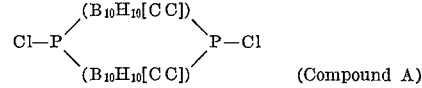

(Compound A)

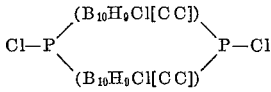

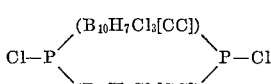

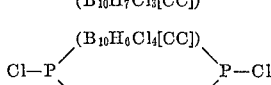

and the corresponding bromine and iodine derivatives. Alkyl-substituted carborane compounds such as:

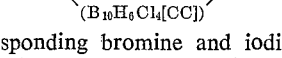

and

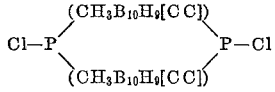

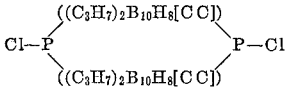

can also be used as starting materials. The formula for Compound A can also be written as $(B_{10}H_{10}C_2P \cdot Cl)_2$.

The process of this invention is conveniently operated at atmospheric pressure although subatmospheric pressures up to +5 atmospheres or more can be employed.

Specific embodiments of this invention are illustrated by the following examples which are to be considered not limitative.

In the examples the term "moles" signifies "gram moles."

EXAMPLE I

A mixture of 4.17 g. (0.01 mole) of dimeric chlorophospha (III)-carborane $(B_{10}H_{10}C_2P\cdot Cl)_2$, sodium azide (2.6 g., 0.04 mole), and ethanol (100 ml.) was stirred with ice-cooling for 2 hours. After filtration, the filter cake was thoroughly washed with water, then dried in vacuo over diphosphorus pentoxide, to give 3.0 g. (70 percent of the theoretical amount) of dimeric-azidophospha (III)-carborane, $(B_{10}H_{10}C_2P\cdot N_3)_2$, M.P. 150° (dec.).

Analysis.—Calc'd for $C_4H_{20}B_{20}N_6P_2$ (430.6) (percent): C, 11.16; H, 4.68; B, 50.25; N, 19.52; P, 14.39. Found (percent): C, 10.95; H, 4.50; B, 50.45; N, 18.88; P, 14.34.

EXAMPLES II–IV

A number of experiments was performed as described in Example VII using ethanol as reaction medium. Pertinent data relative to these experiments are compiled in the following table:

|  | Dimeric chlorophospha (III-) carborane | | Sodium azide | | Yield of Dimeric azidophospha (III-) carborane | |
| --- | --- | --- | --- | --- | --- | --- |
|  | Grams | Moles | Grams | Moles | Grams | Percent |
| Example: |  |  |  |  |  |  |
| II | 4.17 | 0.01 | 2.6 | 0.04 | 2.64 | 61.4 |
| III | 5.61 | 0.0135 | 3.5 | 0.0538 | 3.82 | 66.0 |
| IV | 8.35 | 0.02 | 5.2 | 0.08 | 5.82 | 67.5 |

EXAMPLE V

Dimeric chlorophospha (III)-carborane (4.17 g., 0.01 mole) and sodium azide (2.6 g., 0.04 mole) were charged into a 200 ml. flask cooled with an ice-bath. Methanol (100 ml.) was added and the mixture was stirred for 2 hours at 0° C., then filtered. The filter cake was thoroughly washed with water, ethanol and petroleum ether to give 2.22 g. (51.6 percent of the theoretical amount) of pure azidophospha (III)-carborane.

EXAMPLE VI

A mixture of 2.08 g. (0.005 mole) of dimeric chlorophospha (III)-carborane, sodium azide (1.3 g., 0.02 mole) and isopropanol (50 ml.) was stirred with ice-cooling for 2 hours. After filtration, the solid reaction products were washed with water and dried in vacuo over diphosphorus pentoxide to give 0.6 g. (28 percent of the theoretical amount) of pure dimeric azidophospha (III)-carborane.

EXAMPLE VII

The experiment of preceding Example VI was repeated under the same conditions except for employing n-butanol as reaction medium; dimeric azidophospha (III)-carborane was recovered in 14 percent yield (based on the theoretical amount).

EXAMPLE VIII

A mixture of dimeric chlorophospha (III)-carborane (1.43 g., 0.0034 mole), sodium azide (0.91 g., 0.014 mole) and acetonitrile (35 ml.) was stirred in an ice-bath for 2 hours. After filtration and washing the filter cake with water, 1.0 g. (68 percent of the theoretical amount of azidophospha (III)-carborane, M.P. 150° C. (dec.), was obtained.

The structural formula of the compound prepared in Examples I–VIII (dimeric azidophospha (III)-carborane) has the same structural formula as the structural formula in the drawing with the exception that the chlorine atoms denoted by the single and double asterisks are each replaced by the radical —N=N=N.

Treatment of the dimeric halophospha (III)-carboranes of Alexander and Schroeder application Ser. No. 323,278, filed Nov. 13, 1963, now U.S. Patent 3,373,193, with an excess of sodium azide by the process described in Alexander and Schroeder application Ser. No. 323,416 for Product and Method, filed Nov. 13, 1963, now abandoned, results in the formation of the respective cyclic diazido compound, dimeric azidophospha (III)-carborane. Valuable polymers can be formed by the condensation of dimeric azidophospha (III)-carboranes with a diphosphine, such as 1,4-bis(diphenylphosphino) benzene as set forth in Alexander and Schroeder application Ser. No. 323,394, filed Nov. 13, 1963, now U.S. Patent 3,320,185. These valuable polymeric materials can be compounded with inert mineral fillers, such as asbestos, etc., and then pressure molded to form gaskets, bushings, etc., which are suitable for high pressure and high temperature applications.

The solid products of this invention when incorporated with suitable oxidizers such as ammonium perchlorate, potassium perchlorate, sodium perchlorate, ammonium nitrate etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result in the use of the higher specific impulse material. The products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as pyrotechnic type igniters, and are mechanically strong enough to withstand ordinary handling.

The boron-containing solid material produced by practicing the method of this invention can be employed as an ingredient of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing the calcium decaborane products, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose of doing this, as the art is aware, is to provide proper burning characteristics in the final propellant. In addition to the oxidizer and the oxidizable material, the final propellant can also contain a binder such as an artificial resin, generally of the urea-formaldehyde or phenol-formaldehyde type, or an artificial resin, generally of the urea-formaldehyde or phenol-formaldehyde type, or an artificial rubber like substance, the function of the binder being to give the propellant mechanical strength and at the same time, improve its burning characteristics. Thus, in manufacturing a suitable propellant proper proportions of finely divided oxidizer and finely divided calcium decaborane product can be admixed with a suitable binder, the proportions being such that the amount of the binder is about 5 to 10 percent by weight, based upon the weight of the oxidizer and the calcium decaborane product. The ingredients are thoroughly mixed and following this the mixture is molded into the desired shape, as by extrusion. Thereafter, the binder can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

What is claimed is:

1. A compound of the formula:

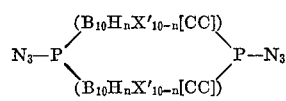

wherein X' is a halogen selected from the group consisting of chlorine, bromine and iodine and $n$ is an integer of from 0 to 10 inclusive.

2.

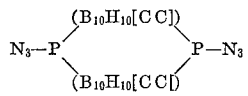

References Cited

UNITED STATES PATENTS

| | | | |
|---|---|---|---|
| 2,712,026 | 6/1955 | Schrader | 260—349 |
| 3,183,251 | 5/1965 | Knowles et al. | 260—349 |
| 3,387,004 | 6/1968 | Mosby et al. | 260—349 |

OTHER REFERENCES

Herring, Chem. Ind. (London), pp. 717–8 (1960).

HENRY R. JILES, Primary Examiner

J. M. FORD, Assistant Examiner

U.S. Cl. X.R.

260—2; 44—4